US006435786B1

United States Patent
Breckel et al.

(10) Patent No.: US 6,435,786 B1
(45) Date of Patent: Aug. 20, 2002

(54) MAIN DECK CARGO BARRIER NET CONFIGURATION

(75) Inventors: David A. Breckel, Bellevue; Timothy R. Schwartz, Poulsbo; Bernhard Dopker, Bellevue, all of WA (US); John W. Startup, Somerset; James Homewood, Dorset, both of (GB)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/624,540

(22) Filed: Jul. 24, 2000

(51) Int. Cl.$^7$ ................................................. B60P 7/08
(52) U.S. Cl. ........................ 410/118; 410/97; 410/129
(58) Field of Search .......................... 410/96, 97, 117, 410/118, 129; 244/118.1, 137.1; 24/265 CD (56) References Cited

U.S. PATENT DOCUMENTS

| | | | | |
|---|---|---|---|---|
| 2,669,402 A | * | 2/1954 | Del Mar | 410/118 |
| 3,486,723 A | * | 12/1969 | Harrison | 410/118 |
| 4,892,210 A | | 1/1990 | Kupersmit | |
| 5,772,371 A | | 6/1998 | Ackerman | 410/118 |
| 5,848,864 A | * | 12/1998 | Selby | 410/97 |
| 5,915,652 A | | 6/1999 | Caldwell et al. | |
| 6,010,286 A | | 1/2000 | Cross et al. | 410/129 |
| 6,217,268 B1 | * | 4/2001 | Chou | 410/97 |

* cited by examiner

*Primary Examiner*—Stephen T. Gordon
(74) *Attorney, Agent, or Firm*—Harness Dickey & Pierce P.L.C.

(57) ABSTRACT

A cargo barrier net for an aircraft includes a central ring. A plurality of radially projecting webs include a radially inner end that is connected to the central ring. A radially outer end is connected to the airframe. The first circumferential web is connected to a first set of mid-portions of the radially projecting webs. A first set of mid-portions is located radially outside of the central ring. A second circumferential web is located radially outside of the first circumferential web. The second circumferential web is connected to a second set of mid-portions of the radially projecting webs. The second set of mid-portions is located radially outside of the first set of mid-portions. A third circumferential web is located radially outside of the second circumferential web. The third circumferential web is connected to a third set of mid-portions of the radially projecting webs. The third set of mid-portions is located radially outside of the second set of mid-portions. A fourth circumferential web is located radially outside of the third circumferential web. The fourth circumferential web is connected to a fourth set of mid-portions of the radially projecting webs. The fourth set of mid-portions is located radially outside of the third set of mid-portions. The radially projecting webs are connected to the circumferential webs using stitches. The radially projecting webs include a shunt with a break-out web that releases under load to allow the radially projecting webs to lengthen.

17 Claims, 7 Drawing Sheets

MAIN DECK CARGO BARRIER NET CONFIGURATION

TECHNICAL FIELD

This invention relates to cargo barrier nets. More particularly, this invention relates to cargo barrier nets that are used to restrain cargo that is being transported by an aircraft.

BACKGROUND OF THE INVENTION

Cargo barrier nets are used to restrain cargo that is being transported by an aircraft. The cargo barrier net is positioned between the occupants of the aircraft and the cargo. The cargo is generally located in an aft portion of the aircraft. The purpose of the cargo barrier net is to protect the occupants who are located in a forward position relative to the cargo barrier net. The configuration of the cargo barrier net determines the magnitude and direction of loads that are placed on an airframe structure of the aircraft when the cargo barrier net restrains the cargo. The configuration of the cargo barrier net also determines a net displacement length of the airframe set aside that is for displacement of the cargo barrier net.

As can be appreciated, the airframe space that is set aside for the net displacement length cannot be used for cargo, passengers and/or equipment. In an effort to increase the amount of payload that can be carried by the aircraft, aircraft manufacturers have decreased the net displacement length. Cargo barrier nets have been redesigned to accommodate the same loads that occur during a crash with a shorter net displacement length. These designs, however, place higher loads on the airframe structure than it is capable of handling. One possible solution is to increase the capacity of the airframe structure in the areas where the cargo barrier net is connected to the airframe structure. Increasing the strength of the airframe structure, however, increases the weight and cost of the aircraft.

Conventional barrier nets have a spider web configuration or a rectangular mesh configuration. When designing a cargo barrier net, simplifying assumptions have been used to establish the shape of the cargo barrier net under load for a particular configuration. Loads imposed on the airframe structure of the aircraft and the net displacement length of the cargo barrier net have been derived from the shape of the cargo barrier net. When shorter net displacement lengths are desired, conventional cargo barrier nets are unable to provide interface loads that are within the structural capability of the airframe structure of the aircraft. A limiting factor has also been the ability to analyze changes to configurations of the cargo barrier net and their impact on the loading of the airframe structure. Therefore, there is a tendency to overdesign the cargo barrier net.

SUMMARY OF THE INVENTION

A cargo net for an aircraft according to the invention includes a central ring. A plurality of radially projecting webs include a radially inner end that is connected to the central ring. A radially outer end of the radially projecting webs is connected to the airframe. A first circumferential web is connected to a first set of mid-portions of the radially projecting webs. The first set of mid-portions is located radially outside of the central ring. The second circumferential web is located radially outside of the first circumferential web. The second circumferential web is connected to a second set of mid-portions of the radially projected webs. The second set of mid-portions is located radially outside of the first set of mid-portions.

In another feature of the invention, a third circumferential web is located radially outside of the second circumferential web. The third circumferential web is connected to a third set of mid-portions of the radially projecting webs. The third set of mid-portions is located radially outside of the second set of mid-portions. The third circumferential web is connected to less than all of the radially projecting webs.

In still another feature of the invention, a fourth circumferential web is located radially outside of the third circumferential web. The fourth circumferential web is connected to a fourth set of mid-portions of the radially projecting webs. The fourth set of mid-portions is located radially outside of the third set of mid-portions. The fourth circumferential web is connected to less than all of the radially projecting webs.

In still other features of the invention, the radially projecting webs are connected to the first, second, third and fourth circumferential webs using stitches.

In yet another feature of the invention, the radially projecting webs include a shunt that releases under load to allow the radially projecting webs to lengthen.

BRIEF DESCRIPTION OF THE DRAWINGS

The various advantages of the present invention will become apparent to one skilled in the art by reading the following specification and sub-joined claims and by referencing the following drawings in which:

DETAILED DESCRIPTION OF THE PREFERRED EMBODIMENTS

Figure 1:
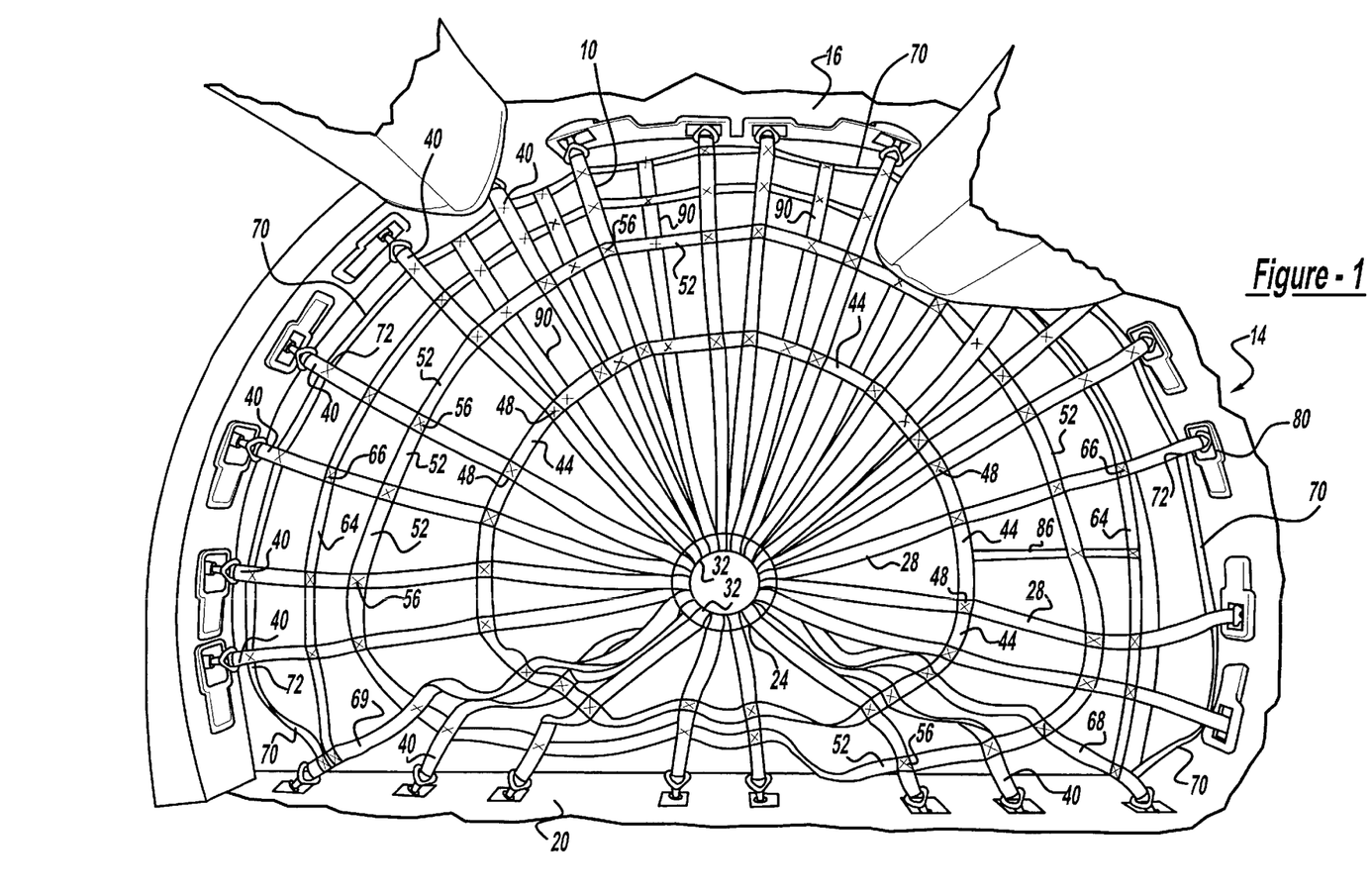
FIG. 1 is a front view of a cargo barrier net according to the present invention installed in an airframe structure.
Figure 2:
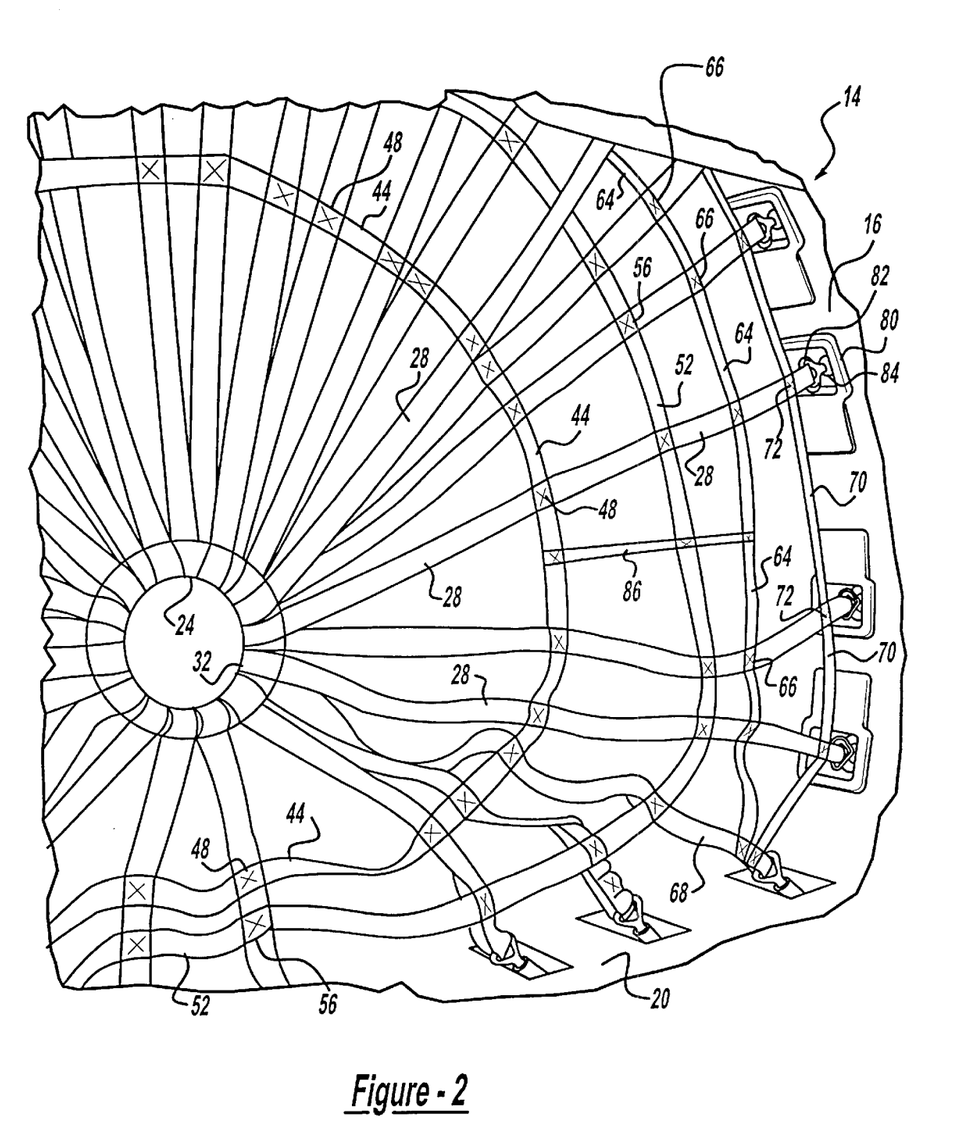
FIG. 2 is a partial front view of the cargo barrier net of FIG. 1.

Referring now to FIGS. 1 and 2, a cargo barrier net 10 according to the present invention is illustrated. The cargo barrier net 10 is connected to an airframe structure 14 that includes a fuselage 16 and a floor 20. The cargo barrier net 10 includes a central ring 24 and a plurality of radially projecting webs 28. Radially inner ends 32 of the radially projecting webs 28 are connected to the central ring 24. Radially outer ends 40 of the radially projecting webs 28 are connected to the airframe structure 14.

A first circumferential web 44 circumscribes the central ring 24 and is located at a first set of mid-portions 48 of the radially projecting webs 28. The first circumferential web 44 is connected to the radially projecting webs 28 at the first set of mid-portions 48. Preferably, stitching is used to connect the first circumferential web 44 to the radially projecting webs 28. The stitches help maintain the angular orientation of the radially projecting webs 28.

A second circumferential web 52 is located at a second set of mid-portions 56 of the radially projecting webs 28. The second set of mid-portions is located radially outward in relation to the first set of mid-portions. The second circumferential web 52 is connected to the radially projecting webs 28 at the second set of mid-portions 56. Preferably, stitching is used to connect the second circumferential web 52 to the radially projecting webs 28. The stitches help maintain the angular orientation of the radially projecting webs 28.

A third circumferential web 64 substantially circumscribes the central ring 24 and is located at a third set of mid-portions 66 of the radially projecting webs 28. The third set of mid-portions 66 is located radially outward relative to the second set of mid-portions 56. The third circumferential web 64 substantially circumscribes the central ring 24. The third circumferential web 64 is connected to the radially projecting webs 28 at the third set of mid-portions 66. Preferably, stitching is employed to connect the third circumferential web 64 to the radially projecting webs 28. The stitches help maintain the angular orientation of the radially projecting webs 28. In a preferred embodiment, the third circumferential web 64 runs adjacent to the fuselage 16 and is connected to and ends at the radially projecting webs 68 and 69 that are connected at opposite outer edges of the floor 20.

A fourth circumferential web 70 is located at fourth set of mid-portions 72 of the radially projecting webs 28. The fourth circumferential web 70 substantially circumscribes the central ring 24. The fourth circumferential web 70 is connected to the radially projecting webs 28 at the fourth set of mid-portions 72. Preferably, stitching is employed to connect the fourth web 70 to the radially projecting webs 28. The fourth circumferential web 70 is located radially outside of the third circumferential web 64. In a preferred embodiment, the fourth circumferential web 70 runs adjacent to the fuselage 16 and is connected to and ends at the radially projecting webs 68 and 69 that are connected at opposite outer edges of the floor 20. The fourth circumferential web 70 also functions as a locating web and helps to prevent the entanglement of the radially projecting webs 28 with other webs.

One or more of the webs 44, 52, 64 and 70 may include inner and outer web portions. For example, in FIG. 4B, the third circumferential web 64 includes an inner web portion 64A and an outer web portion 64B that are attached to opposite sides of the radially projecting web 28.

The radially outer ends 40 of substantially all of the radially projecting webs 28 are connected to the airframe structure 14 using connection assemblies 80. The connection assemblies 80 include first and second mating connectors 82 and 84 and a web release mechanism 85 that are shown and described more fully in conjunction with FIGS. 3, 4A, and 4B. One or more webs 86 can be used to connect two or more of the circumferential webs 44, 52, 64 and 70 in a radial direction to prevent articles from passing through the cargo barrier net 10.

The cargo barrier net 10 includes a plurality of test straps 90 that have one end connected to the central ring 24 and an opposite end that terminates at the fourth circumferential web 70. The test straps 90 are used in a tension pull test to verify the strength of the webs used in the cargo barrier net 10. One of the test straps 90 is tested approximately every two years or so. If five test straps 90 are provided, the tests can be performed over a ten year period. The removal of the test straps 90 during the tension pull test does not impact the function of the cargo barrier net 10.

As can be appreciated from FIGS. 1 and 2, the cargo barrier net 10 according to the present invention maintains small openings in a central portion of the cargo barrier net 10 that is adjacent to the central ring 24. Small openings in the cargo barrier net 10 are important to prevent articles from passing through the cargo barrier net 10 as the cargo barrier net 10 expands forward under load. Larger openings in the cargo barrier net 10 are located adjacent the fuselage 16 and the floor 20 as the cargo barrier net 10 expands under the load. The likelihood that small articles will pass through the cargo barrier net 10 is minimized by the cargo barrier net 10.

Finite element analysis was used to reduce, minimize, and/or equalize the loads on the aircraft structure 14. In addition, finite element analysis was used to limit the displacement length of the cargo barrier net 10 to prevent the cargo barrier net 10 from unnecessarily restricting revenue generating area of the aircraft.

By attaching the circumferential webs 44, 52, 64 and 70 to the radially projecting webs 28, the attachment angle of the radially projecting webs 28 relative to the fuselage 16 and the floor 20 is favorably controlled. This prevents large inboard loading on the connection assembly 80 that attach the cargo barrier net 10 to the floor 20. This also prevents adverse vertical or inboard loading on the connection assembly 80 that attach the cargo barrier net 10 to the fuselage 16.

Figure 3:
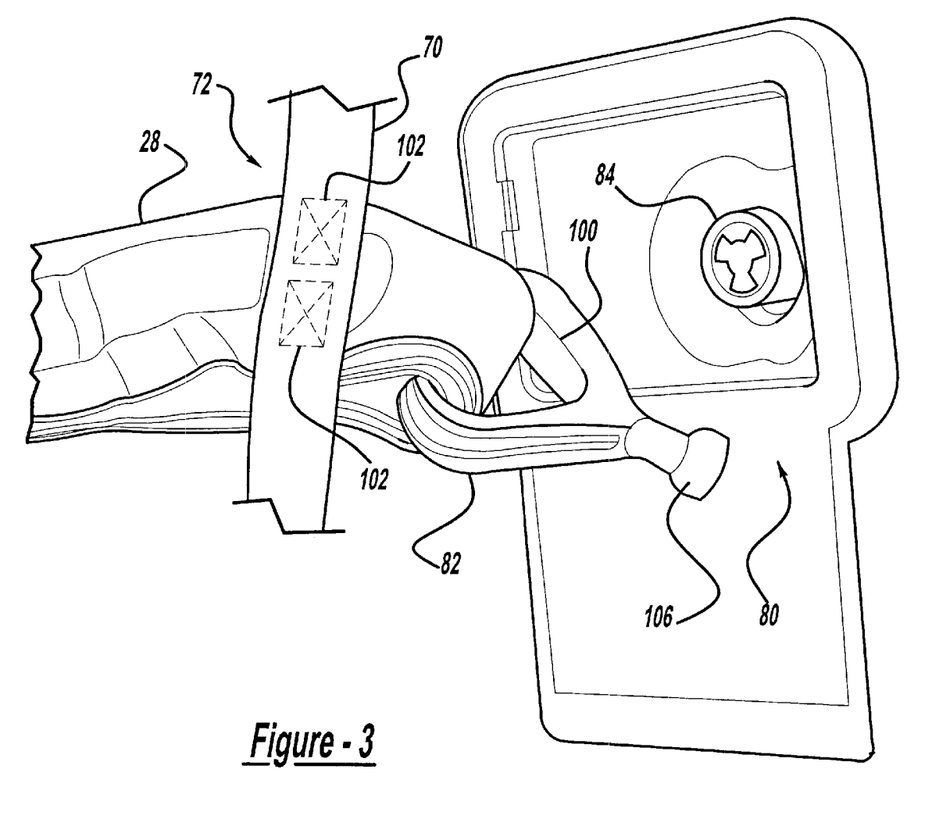
FIG. 3 is a view of a connector, the cargo barrier net and an anchor.

Referring now to FIG. 3, the connection assembly 80 is shown in more detail. The first connector 82 includes an opening 100 for receiving an end of the radially projecting web 28. The radially projecting web 28 includes stitches that fasten the end of the radially projecting web 28 around the opening 100. Stitches 102 connect the fourth circumferential web 70 to the radially projecting web 28. The connector 82 includes an end 106 that is mating received by the second connector 84. While first and second mating connectors 82 and 84 are disclosed, skilled artisans can appreciate that other types of connectors are contemplated. For example, ends of the radially projecting webs 28 can be connected to fixed mountings using stitches or other methods.

Figure 4A:
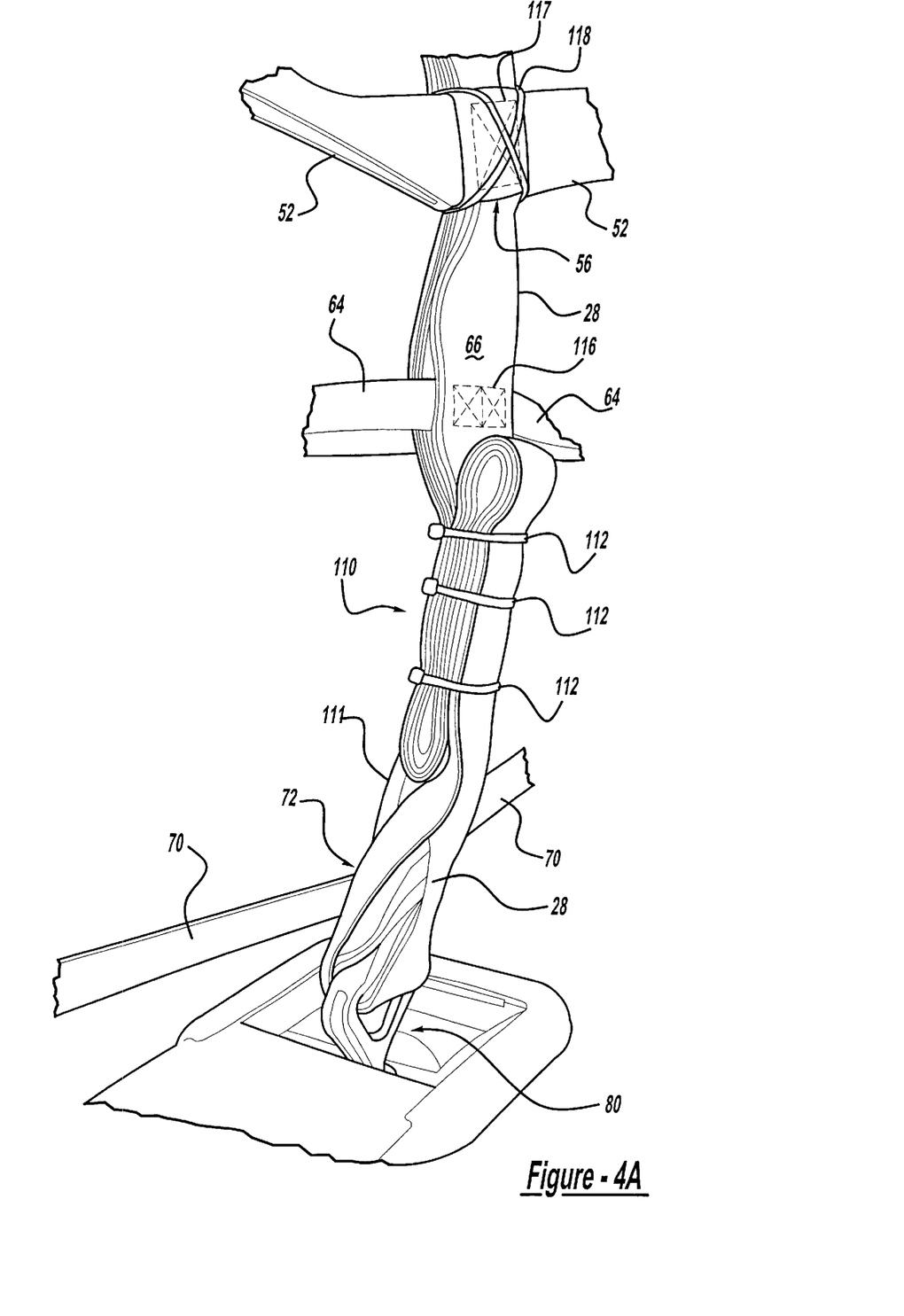
FIG. 4A is a perspective view showing a front side of a shunt of the cargo barrier net.
Figure 4B:
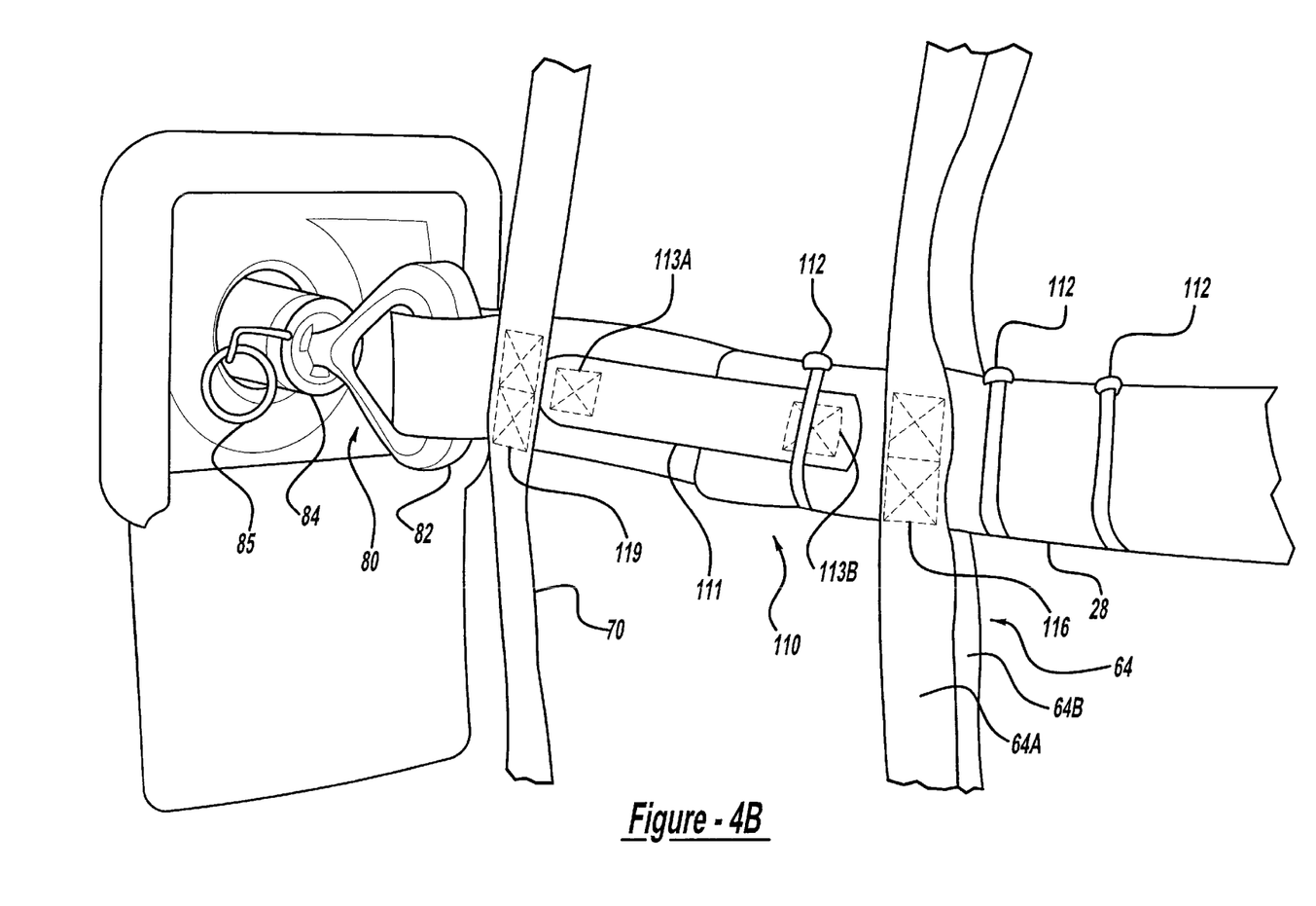
FIG. 4B is a rear view of the shunt of FIG. 4A.

Referring now to FIGS. 4A and 4B, the connector assembly 80 and the radially projecting web 28 are shown in further detail. The radially projecting web 28 includes a shunt 110 that includes an additional length of the radially projecting web 28 and a break-out web 111 that constrains the additional length of the radially projecting web 28. Opposite ends of the break-out web 111 are connected to the same radially projecting web 28. During a crash, the break-out web 111 of the shunts 110 releases under load to allow the additional length of the radially projecting web 28 to extend. The cargo barrier net 10 takes on a three dimensional shape. The break-out webs 111 preferably require a significant load to be placed on the radially projecting web 28 before breaking out. For example, aircraft technicians should not be able to break the break-out webs 111 by pulling or hanging on the radially projecting webs 28.

The third circumferential web 64 is preferably attached to the third set of mid-portions 66 using stitches 116. The second circumferential web 52 is preferably attached to the second set of mid-portions 56 using stitches 117. Binding connectors 112 and 118 are used to provide a neater package for the cargo barrier net 10. The fourth circumferential web 70 is connected to the radially projecting web 28 using stitches 119. The break-out web 111 includes stitches 113A and 113B that connect the break-out web 111 to the radially projecting web 28. When a crash occurs, one or both of the stitches 113A and 113B break and allow the radially projecting web 28 to lengthen.

Figure 5:
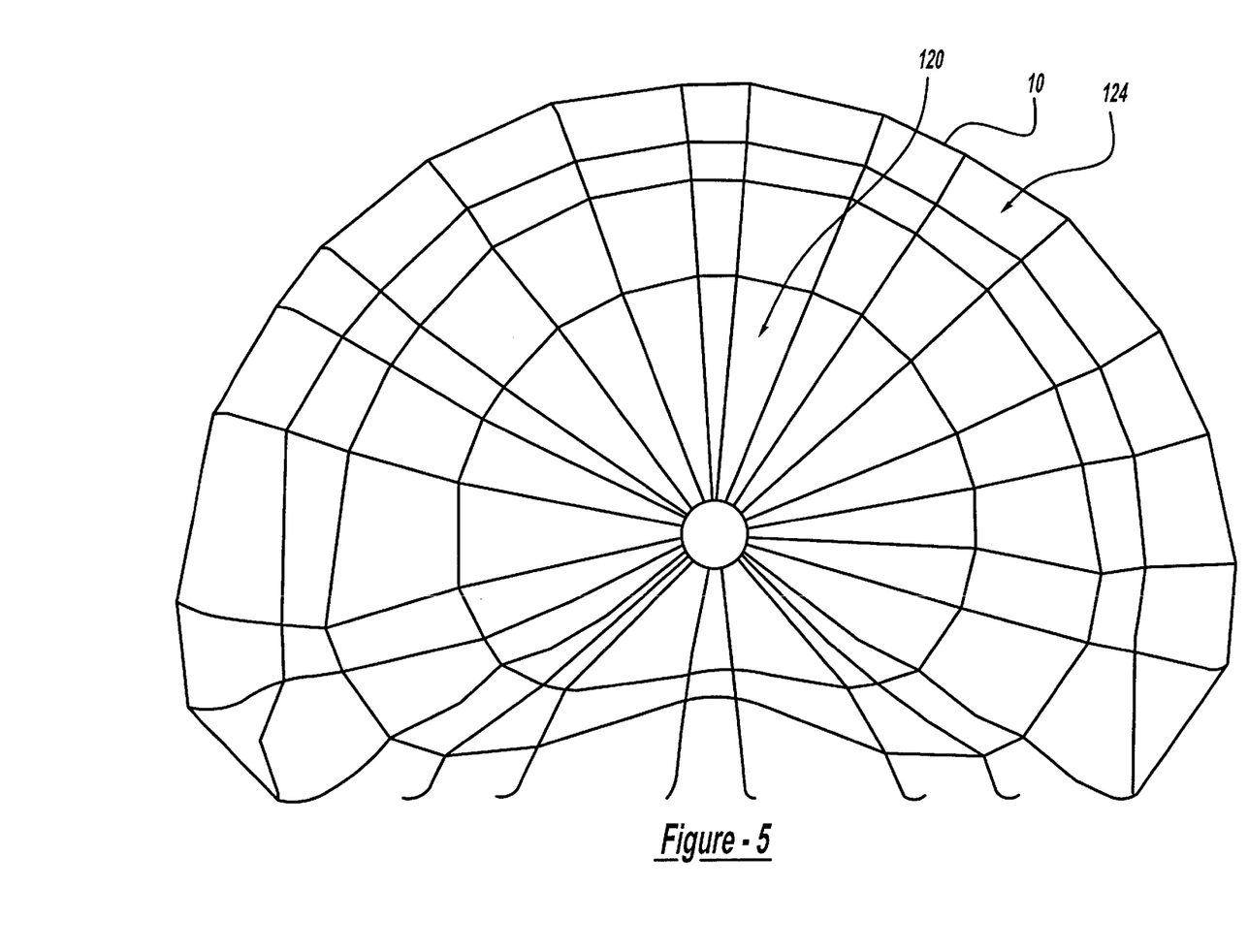
FIG. 5 illustrates the cargo barrier net of FIG. 1 fully-loaded.
Figure 6:
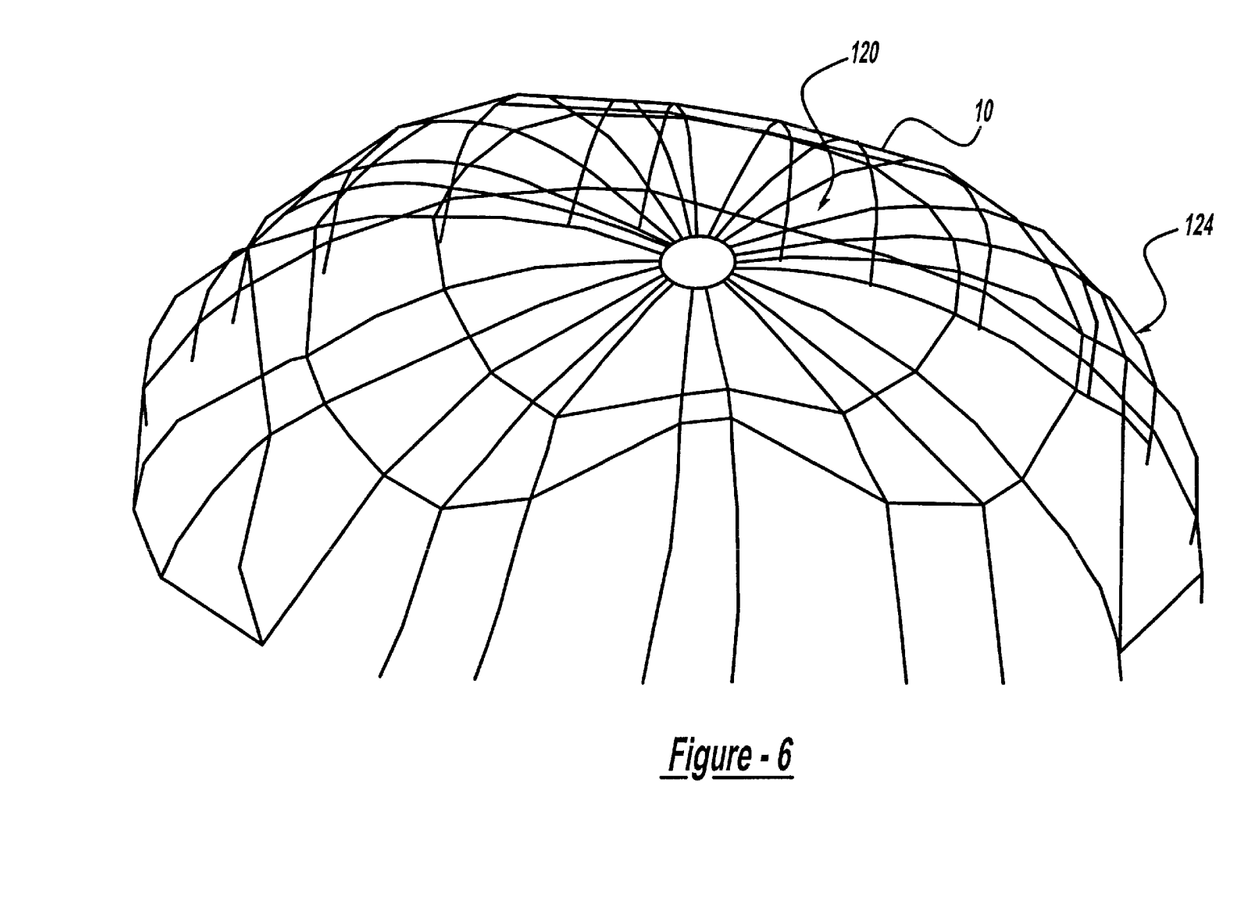
FIG. 6 is an isometric view of the cargo barrier net of FIG. 1 fully-loaded.

Referring now to FIG. 5, a front view of the cargo barrier net 10 under full load is shown. In FIG. 6, an isometric view of the cargo barrier net 10 is shown. Radially inner portions 120 of the cargo barrier net 10 have a higher web density to keep articles in the cargo barrier net 10. Radially outer portions 124 are located adjacent the fuselage 16 and the floor 20 to prevent articles from getting through the cargo barrier net 10.

The shape of the cargo barrier net 10 is controlled using stitching to connect the circumferential webs 44, 52, 64, and 70 to the radially projecting web 28. The first and second circumferential webs 44 and 52 are made with heavier plies than the third and fourth circumferential webs 64 and 70. The first and second circumferential webs 44 and 52 carry more load than the third and fourth webs 64 and 70.

The circumferential webs 44, 52, 64 and 70 are connected to the radially projecting web 28 to control the angle of the webs 28 at the attachment to the airframe 14. An extra length of the radially projecting webs 28 is shunted so that the cargo barrier net 10 can be installed in the airframe 14. The shunts 110 break-out under load to help keep the radial component of the attachment loads small and to keep the larger openings in the cargo barrier net 10 next to the fuselage 16 and the floor 20. Small net openings are maintained in the central portion of the cargo barrier net 10. The design of the cargo barrier net 10 has been optimized and the supporting structure in the airframe has been minimized. Thus, both the cargo barrier net 10 and the airframe 14 are light weight. The cargo displacement length of the barrier net has been limited to 42 inches for 737–700C aircraft. Other designs use as much as 48 inches in the 737–200C aircraft. Thus, the cargo barrier net 10 according to the invention maximizes payload (revenue generating) area by reducing the net displacement length. In a preferred embodiment, the webs are made of polyester.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A cargo barrier net for an aircraft comprising:
   a central ring;
   a plurality of radially projecting webs that have a radially inner end that is connected to said central ring and a radially outer end that is capable of being connected to an airframe of said aircraft;
   a first circumferential web that is connected to a first set of mid-portions of said radially projecting webs wherein said first set of mid-portions is located radially outside of said central ring; and
   a second circumferential web, located radially outside of said first circumferential web, that is connected to a second set of mid-portions of said radially projecting webs, wherein said second set of mid-portions is located radially outside of said first set of mid-portions, wherein said radially projecting webs include a shunt and a break-out web.

2. The cargo barrier net of claim 1 further comprising:
   a third circumferential web, located radially outside said second circumferential web, that is connected to a third set of mid-portions of said radially projecting webs, wherein said third set of mid-portions is located radially outside of said second set of mid-portions.

3. The cargo barrier net of claim 2 wherein said third circumferential web is connected to less than all of said radially projecting webs.

4. The cargo barrier net of claim 3 further comprising:
   a fourth circumferential web, located radially outside said third circumferential web, that is connected to a fourth set of mid-portions of said radially projecting webs, wherein said fourth set of mid-portions is located radially outside of said third set of mid-portions.

5. The cargo barrier net of claim 4 wherein said fourth circumferential web is connected to less than all of said radially projecting webs.

6. The cargo barrier net of claim 1 wherein said radially projecting webs are connected to said first and second circumferential webs using stitches.

7. The cargo barrier net of claim 5 wherein said radially projected webs are connected to said first and second circumferential webs and said third and fourth circumferential webs using stitching.

8. The cargo barrier net of claim 1 further comprising a plurality of connector assemblies for connecting said radially projecting webs to said airframe.

9. A cargo barrier net for an aircraft comprising:
   a central ring;
   a plurality of radially projecting webs that have a radially inner end that is connected to said central ring and a radially outer end that is capable of being connected to an airframe of said aircraft;
   a first circumferential web that is connected to a first set of mid-portions of said radially projecting webs wherein said first set of mid-portions is located radially outside of said central ring;
   a second circumferential web, located radially outside of said first circumferential web, that is connected to a second set of mid-portions of said radially projecting webs, wherein said second set of mid-portions is located radially outside of said first set of mid-portions; and
   a plurality of radial webs having one end connected to said first circumferential web and an opposite end connected to said second circumferential web to prevent articles from passing through said cargo barrier net wherein said radially projecting webs include a shunt with a breakout web that releases under load to allow said radially projecting webs to lengthen.

10. The cargo barrier net of claim 1 wherein said breakout web releases under load and to allow said radially projecting webs to lengthen.

11. A cargo barrier net for an aircraft comprising:
    a central ring;
    a plurality of radially projecting webs that have a radially inner end that is connected to said central ring and a radially outer end that is capable of being connected to an airframe of said aircraft;
    a first circumferential web that is connected to a first set of mid-portions of said radially projecting webs wherein said first set of mid-portions is located radially outside of said central ring; and
    a second circumferential web, located radially outside of said first circumferential web, that is connected to a second set of mid-portions of said radially projecting webs, wherein said second set of mid-portions is located radially outside of said first set of mid-portions, wherein said radially projecting webs include a shunt with a break-out web that releases under load to allow said radially projecting webs to lengthen.

12. The cargo barrier net of claim 11 further comprising:
    a circumferential third web, located radially outside said second circumferential web, that is connected to a third set of mid-portions of said radially projecting webs, wherein said third set of mid-portions is located radially outside of said second set of mid-portions.

13. The cargo barrier net of claim 12 wherein said third circumferential web is connected to less than all of said radially projecting webs.

14. The cargo barrier net of claim 13 further comprising a fourth circumferential web, located radially outside said third circumferential web, that is connected to a fourth set of mid-portions of said radially projecting webs, wherein said fourth set of mid-portions is located radially outside of said third set of mid-portions.

15. The cargo barrier net of claim 14 wherein said fourth circumferential web is connected to less than all of said radially projecting webs.

16. A cargo barrier net for an aircraft comprising:

a central ring;

a plurality of radially projecting webs that have a radially inner end that is connected to said central ring and a radially outer end that is capable of being connected to an airframe of said aircraft;

a first circumferential web that is connected to a first set of mid-portions of said radially projecting webs wherein said first set of mid-portions is located radially outside of said central ring; and a second circumferential web, located radially outside of said first circumferential web, that is connected to a second set of mid-portions of said radially projecting webs, wherein said second set of mid-portions is located radially outside of said first set of mid-portions, wherein at least one of said first and second circumferential webs include an inner and an outer web portion attached to opposite sides of said radially projecting webs.

17. The cargo barrier net of claim 16 wherein said radially projecting webs include a shunt with a break-out web that releases under load to allow said radially projecting webs to lengthen.

* * * * *

UNITED STATES PATENT AND TRADEMARK OFFICE
CERTIFICATE OF CORRECTION

PATENT NO.    : 6,435,786 B1                              Page 1 of 1
DATED         : August 20, 2002
INVENTOR(S)   : David A. Breckel et al.

It is certified that error appears in the above-identified patent and that said Letters Patent is hereby corrected as shown below:

Column 5,
Line 51, remove "and" after "ring" and add -- and -- after "mid-portions".

Column 6,
Line 56, remove "and" after "ring".
Line 61, remove "," and add -- ; -- and add -- and -- at end of sentence.

Column 8,
Line 4, remove "and" at end of line.
Line 10, remove "," and add -- ; and -- at end of sentence.

Signed and Sealed this

Fifth Day of August, 2003

JAMES E. ROGAN
*Director of the United States Patent and Trademark Office*